(12) United States Patent
Johns et al.

(10) Patent No.: US 7,875,151 B2
(45) Date of Patent: Jan. 25, 2011

(54) KAOLIN PRODUCTS AND THEIR PRODUCTION

(75) Inventors: Philip Kenneth Johns, St Columb (GB); David Leslie Light, Truro (GB)

(73) Assignee: Imerys Minerals Ltd., Par Cornwall (GB)

( * ) Notice: Subject to any disclaimer, the term of this patent is extended or adjusted under 35 U.S.C. 154(b) by 0 days.

(21) Appl. No.: 12/234,531

(22) Filed: Sep. 19, 2008

(65) Prior Publication Data

US 2009/0065163 A1    Mar. 12, 2009

Related U.S. Application Data

(62) Division of application No. 10/344,676, filed as application No. PCT/GB01/03717 on Aug. 17, 2001, now Pat. No. 7,442,281.

(30) Foreign Application Priority Data

Aug. 17, 2000 (GB) ................... 0020180.6

(51) Int. Cl.
    *D21H 11/00* (2006.01)
(52) U.S. Cl. .................... 162/181.8; 106/486; 106/487
(58) Field of Classification Search .............. 162/181.8; 106/486, 487, 484
    See application file for complete search history.

(56) References Cited

U.S. PATENT DOCUMENTS

| | | | |
|---|---|---|---|
| 2,158,987 A | 5/1939 | Maloney | |
| 2,414,391 A | 1/1947 | Peaker | |
| 2,531,396 A | 11/1950 | Carter et al. | |
| 2,883,356 A | 4/1959 | Gluesenkamp | |
| 3,034,859 A | 5/1962 | Gunn et al. | |
| 3,171,718 A | 3/1965 | Gunn et al. | |
| 3,291,769 A | 12/1966 | Woodford et al. | |
| 3,463,350 A | 8/1969 | Unger | |
| 3,526,768 A | 9/1970 | Rai et al. | |
| 3,615,806 A | 10/1971 | Torock et al. | |
| 3,635,662 A | 1/1972 | Lyons | |
| 3,663,260 A | 5/1972 | Poppe et al. | |
| 3,790,402 A | 2/1974 | Eastes | |
| 3,798,044 A | 3/1974 | Whitley et al. | |
| 4,082,880 A | 4/1978 | Zboril | |
| 4,102,974 A | 7/1978 | Boni | |
| 4,125,411 A | 11/1978 | Lyons | |
| 4,176,148 A | 11/1979 | Magder et al. | |
| 4,183,991 A | 1/1980 | Smiley et al. | |
| 4,198,333 A | 4/1980 | von Bonin et al. | |
| 4,221,697 A | 9/1980 | Osborn et al. | |
| 4,225,496 A | 9/1980 | Columbus et al. | |
| 4,227,920 A | 10/1980 | Chapman et al. | |
| 4,233,199 A | 11/1980 | Abolins et al. | |
| 4,234,469 A | 11/1980 | Ohta et al. | |
| 4,241,142 A | 12/1980 | Kaliski et al. | |
| 4,243,574 A | 1/1981 | Manwiller | |
| 4,250,077 A | 2/1981 | von Bonin et al. | |
| 4,251,576 A | 2/1981 | Osborn et al. | |
| 4,298,711 A | 11/1981 | Moulson et al. | |
| 4,311,635 A | 1/1982 | Pearson | |
| 4,359,497 A | 11/1982 | Magder et al. | |
| 4,381,948 A | 5/1983 | McConnell et al. | |
| 4,409,344 A | 10/1983 | Moulson | |
| 4,414,352 A | 11/1983 | Cohen et al. | |
| 4,427,450 A | 1/1984 | Kostansek | |
| 4,467,057 A | 8/1984 | Dieck et al. | |
| 4,528,235 A | 7/1985 | Sacks et al. | |
| 4,543,287 A | 9/1985 | Briggs et al. | |
| 4,546,126 A | 10/1985 | Breitenfellner et al. | |
| 4,582,866 A | 4/1986 | Shain | |
| 4,584,333 A | 4/1986 | Prigent et al. | |
| 4,708,975 A | 11/1987 | Shain | |
| 4,728,478 A | 3/1988 | Sacks et al. | |
| 4,795,776 A | 1/1989 | Milner | |
| 4,800,103 A | 1/1989 | Jeffs | |
| 4,820,761 A | 4/1989 | Saito et al. | |
| 4,873,116 A | 10/1989 | Ancker | |

(Continued)

FOREIGN PATENT DOCUMENTS

CA    2 089 613    9/1993

(Continued)

OTHER PUBLICATIONS

Brochure: Kaopaques Delaminated Aluminum Silicates for Paint Systems, Georgia Kaolin Co., 433 N. Broad Street, Elizabeth, NJ 07207, Oct. 1975.

(Continued)

*Primary Examiner*—Mark Halpern
(74) *Attorney, Agent, or Firm*—Finnegan, Henderson, Farabow, Garrett & Dunner, L.L.P.

(57) ABSTRACT

A particulate product comprising kaolin produced from a method wherein the kaolin of a feed suspension is such that not more than 30% by weight has a particle size less than 2 µm and not more than 30% by weight has a particle size greater than 10 µm, wherein the kaolin of a product suspension produced is such that not more than 10% by weight has a particle size greater than 10 µm and not more than 10% by weight has a particle size less than 0.25 µm, and wherein the particulate product comprises kaolin produced from a fine fraction suspension.

27 Claims, 1 Drawing Sheet

U.S. PATENT DOCUMENTS

Figure 1:
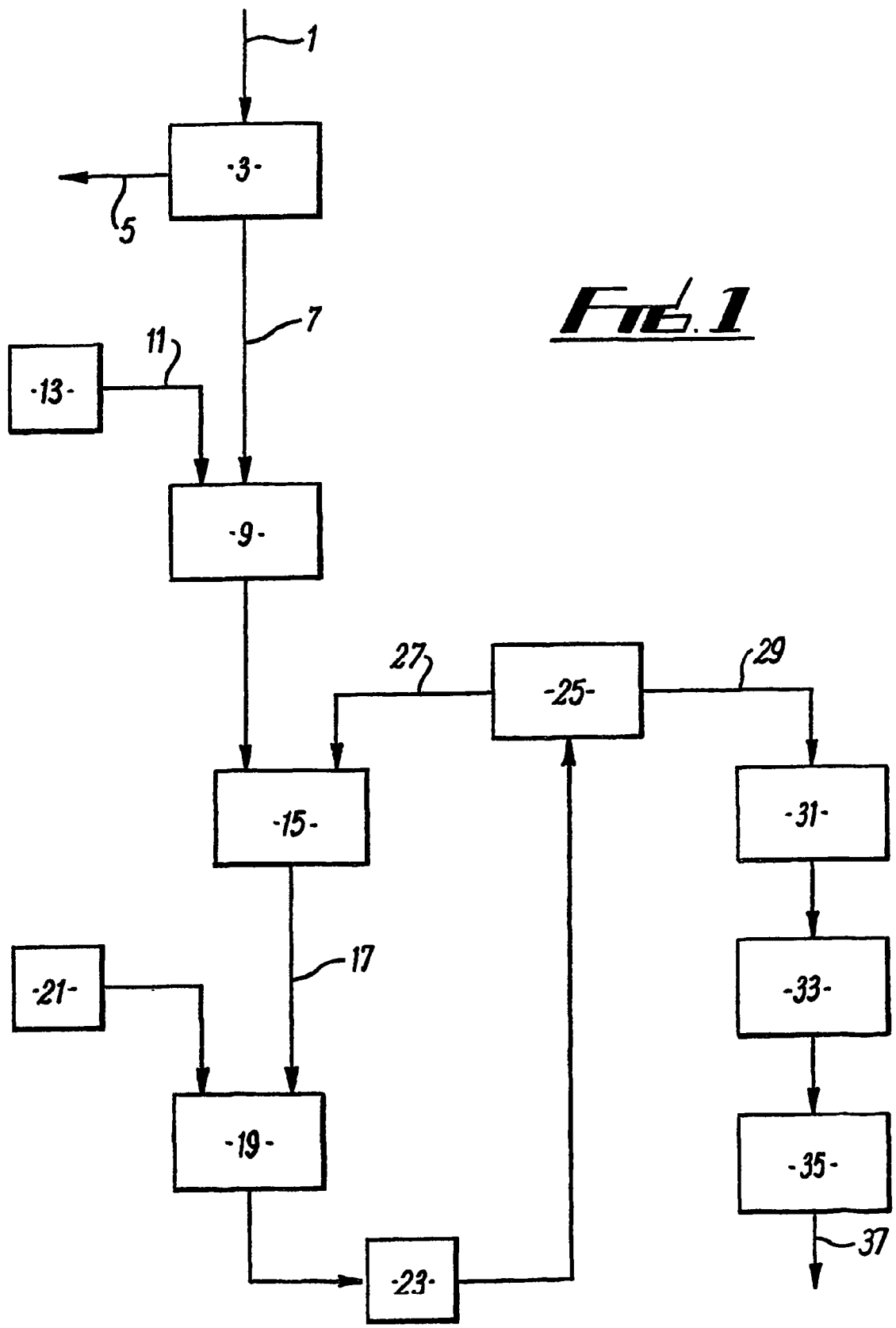

| | | | |
|---|---|---|---|
| 4,888,315 A | 12/1989 | Bowman et al. |
| 4,889,886 A | 12/1989 | Wada et al. |
| 4,918,127 A | 4/1990 | Adur et al. |
| 4,943,324 A | 7/1990 | Bundy et al. |
| 4,948,664 A | 8/1990 | Brociner |
| 4,966,638 A | 10/1990 | Mudgett |
| 4,981,521 A | 1/1991 | Bettacchi et al. |
| 5,085,707 A | 2/1992 | Bundy et al. |
| 5,104,925 A | 4/1992 | Honda et al. |
| 5,109,051 A | 4/1992 | Kroenke et al. |
| 5,112,782 A | 5/1992 | Brown et al. |
| 5,128,606 A | 7/1992 | Gate et al. |
| 5,153,039 A | 10/1992 | Porter et al. |
| 5,167,707 A | 12/1992 | Freeman et al. |
| 5,168,083 A | 12/1992 | Matthews et al. |
| 5,169,443 A | 12/1992 | Willis et al. |
| 5,214,091 A | 5/1993 | Tanaka et al. |
| 5,234,763 A | 8/1993 | Rosen |
| 5,294,654 A | 3/1994 | Hellstern-Burnell et al. |
| 5,302,404 A | 4/1994 | Rissanen et al. |
| 5,332,493 A | 7/1994 | Ginn et al. |
| 5,364,899 A | 11/1994 | Watanabe et al. |
| 5,411,587 A | 5/1995 | Willis et al. |
| 5,416,151 A | 5/1995 | Tanaka |
| 5,439,558 A | 8/1995 | Bergmann et al. |
| 5,454,865 A | 10/1995 | Ginn et al. |
| 5,516,829 A | 5/1996 | Davis et al. |
| 5,522,924 A | 6/1996 | Smith et al. |
| 5,573,946 A | 11/1996 | Haxell et al. |
| 5,578,659 A | 11/1996 | Anada et al. |
| 5,624,488 A | 4/1997 | Forbus et al. |
| 5,635,279 A | 6/1997 | Ma et al. |
| 5,645,635 A | 7/1997 | Behl et al. |
| 5,665,183 A | 9/1997 | Kresge et al. |
| 5,685,900 A | 11/1997 | Yuan et al. |
| 5,695,608 A | 12/1997 | Yagi et al. |
| 5,700,560 A | 12/1997 | Kotani et al. |
| 5,707,912 A | 1/1998 | Lowe et al. |
| 5,735,946 A | 4/1998 | Bloodworth et al. |
| 5,749,958 A | 5/1998 | Behl et al. |
| 5,810,998 A | 9/1998 | Arrington-Webb et al. |
| 5,846,309 A | 12/1998 | Freeman et al. |
| 5,879,512 A | 3/1999 | McGenity et al. |
| 5,883,173 A | 3/1999 | Elspass et al. |
| 5,897,411 A | 4/1999 | Stark et al. |
| 5,925,454 A | 7/1999 | Bekele |
| 5,948,156 A | 9/1999 | Coutelle et al. |
| 5,952,093 A | 9/1999 | Nichols et al. |
| 6,031,036 A | 2/2000 | Rosenquist et al. |
| 6,087,016 A | 7/2000 | Feeney et al. |
| 6,117,541 A | 9/2000 | Frisk |
| 6,149,723 A | 11/2000 | Pruett et al. |
| 6,186,335 B1 | 2/2001 | Arrington-Webb et al. |
| 6,193,831 B1 | 2/2001 | Overcash et al. |
| 6,232,389 B1 | 5/2001 | Feeney et al. |
| 6,238,793 B1 | 5/2001 | Takahashi et al. |
| 6,245,395 B1 | 6/2001 | Falat et al. |
| 6,262,161 B1 | 7/2001 | Betso et al. |
| RE37,385 E | 9/2001 | Okada et al. |
| 6,312,511 B1 | 11/2001 | Bilimoria et al. |
| 6,358,576 B1 | 3/2002 | Adur et al. |
| 6,402,826 B1 | 6/2002 | Yuan et al. |
| 6,416,817 B1 | 7/2002 | Rangwalla et al. |
| 6,447,845 B1 | 9/2002 | Nanavati et al. |
| 6,447,860 B1 | 9/2002 | Mueller et al. |
| 6,465,064 B1 | 10/2002 | Branch |
| 6,531,196 B1 | 3/2003 | Aho et al. |
| 6,537,363 B1 | 3/2003 | Golley et al. |
| 6,545,079 B1 | 4/2003 | Nurmi et al. |
| 6,554,892 B1 | 4/2003 | Manasso et al. |
| 6,564,199 B1 | 5/2003 | Pruett et al. |
| 6,623,866 B2 | 9/2003 | Migliorini et al. |
| 6,632,868 B2 | 10/2003 | Qian et al. |
| 6,759,463 B2 | 7/2004 | Lorah et al. |
| 6,790,896 B2 | 9/2004 | Chaiko |
| 6,794,042 B1 | 9/2004 | Merlin et al. |
| 6,838,507 B2 | 1/2005 | Chou et al. |
| 6,841,211 B1 | 1/2005 | Knoll et al. |
| 6,884,450 B2 | 4/2005 | Wu et al. |
| 6,887,302 B2 | 5/2005 | Rajagopalan et al. |
| 6,914,095 B2 | 7/2005 | Lorah et al. |
| 6,942,897 B2 | 9/2005 | Joyce et al. |
| 2003/0187120 A1 | 10/2003 | Chaiko et al. |
| 2004/0033379 A1 | 2/2004 | Grunlan et al. |
| 2004/0161594 A1 | 8/2004 | Joyce et al. |
| 2004/0241475 A1 | 12/2004 | Morabito |
| 2005/0145138 A1 | 7/2005 | Raju et al. |
| 2005/0171243 A1 | 8/2005 | Hemmings et al. |
| 2005/0228096 A1 | 10/2005 | Kirsten et al. |
| 2005/0228104 A1 | 10/2005 | Feeney et al. |

FOREIGN PATENT DOCUMENTS

| | | |
|---|---|---|
| CA | 2 467 284 | 11/2004 |
| DE | 2 241 577 | 3/1973 |
| DE | 2 449 656 | 12/1975 |
| DE | 2 818 954 | 1/1980 |
| DE | 2 739 620 | 4/1980 |
| DE | 2 658 814 | 11/1980 |
| DE | 3 012 235 | 1/1981 |
| DE | 3 047 269 | 6/1982 |
| DE | 3 632 606 | 4/1987 |
| DE | 3 536 371 | 5/1987 |
| DE | 3 540 524 | 5/1987 |
| DE | 3 750 864 | 4/1988 |
| DE | 3 884 605 | 8/1988 |
| DE | 4 301 730 | 11/1994 |
| DE | 4 213 746 | 8/1995 |
| DE | 100 10 941 | 9/2001 |
| EP | 0 001 066 | 4/1980 |
| EP | 0 026 075 | 4/1981 |
| EP | 0 054 424 | 6/1982 |
| EP | 0 132 094 | 1/1985 |
| EP | 0 132 228 | 1/1985 |
| EP | 0 160 777 | 11/1985 |
| EP | 0 163 427 | 12/1985 |
| EP | 0 217 626 | 4/1987 |
| EP | 0 222 138 | 5/1987 |
| EP | 0 222 298 | 5/1987 |
| EP | 0 239 986 | 10/1987 |
| EP | 0 245 553 | 11/1987 |
| EP | 0 262 649 | 4/1988 |
| EP | 0 274 888 | 7/1988 |
| EP | 0 341 981 | 11/1989 |
| EP | 0 352 714 | 1/1990 |
| EP | 0 456 363 | 11/1991 |
| EP | 0 204 324 | 2/1992 |
| EP | 0 475 434 | 3/1992 |
| EP | 0 524 635 | 1/1993 |
| EP | 0 528 078 | 2/1993 |
| EP | 0 543 793 | 5/1993 |
| EP | 0 586 904 | 3/1994 |
| EP | 0 588 239 | 3/1994 |
| EP | 0 589 461 | 3/1994 |
| EP | 0 596 442 | 5/1994 |
| EP | 0 494 594 | 10/1995 |
| EP | 0 691 375 | 1/1996 |
| EP | 0 764 739 | 3/1997 |
| EP | 0 804 505 | 11/1997 |
| EP | 0 824 130 | 2/1998 |
| EP | 0 991 530 | 4/2000 |
| EP | 0 991 815 | 4/2000 |
| EP | 1 088 852 | 4/2001 |
| EP | 1 245 730 | 10/2002 |

| | | |
|---|---|---|
| EP | 1 484 176 | 12/2004 |
| EP | 1 512 552 | 3/2005 |
| FR | 1 299 089 | 7/1962 |
| FR | 2 150 953 | 11/1973 |
| FR | 2 273 040 | 11/1977 |
| FR | 2 389 645 | 1/1980 |
| FR | 2 359 874 | 11/1980 |
| FR | 2 452 511 | 1/1981 |
| FR | 2 558 168 | 4/1986 |
| FR | 2 774 689 | 8/1999 |
| FR | 2 822 086 | 9/2002 |
| GB | 819 050 | 8/1959 |
| GB | 1 032 536 | 6/1966 |
| GB | 1 100 496 | 1/1968 |
| GB | 1 101 950 | 2/1968 |
| GB | 1 118 723 | 7/1968 |
| GB | 1 136 350 | 12/1968 |
| GB | 1 241 177 | 7/1971 |
| GB | 1 310 933 | 3/1973 |
| GB | 1 375 057 | 11/1974 |
| GB | 1 469 028 | 3/1977 |
| GB | 1 493 393 | 11/1977 |
| GB | 1 496 088 | 12/1977 |
| GB | 1 513 657 | 6/1978 |
| GB | 1 597 213 | 9/1981 |
| GB | 2 223 758 | 8/1988 |
| GB | 2 240 398 | 7/1991 |
| GB | 2 306 392 | 5/1997 |
| GB | 2 310 215 | 8/1997 |
| JP | 51 005383 | 1/1976 |
| JP | 53 016063 | 2/1978 |
| JP | 54 010394 | 1/1979 |
| JP | 54 047751 | 4/1979 |
| JP | 55 129439 | 10/1980 |
| JP | 55 131024 | 10/1980 |
| JP | 59 074152 | 4/1984 |
| JP | 60 023448 | 2/1985 |
| JP | 60 038455 | 2/1985 |
| JP | 60 084364 | 5/1985 |
| JP | 60 161443 | 8/1985 |
| JP | 60 235858 | 11/1985 |
| JP | 62 116667 | 5/1987 |
| JP | 62 232452 | 10/1987 |
| JP | 63 132964 | 6/1988 |
| JP | 63 175047 | 7/1988 |
| JP | 02 018362 | 1/1990 |
| JP | 02 034653 | 2/1990 |
| JP | 02 045551 | 2/1990 |
| JP | 07 251486 | 10/1991 |
| JP | 04 122752 | 4/1992 |
| JP | 4 270650 | 9/1992 |
| JP | 05 262974 | 10/1993 |
| JP | 06 016918 | 1/1994 |
| JP | 06 065490 | 3/1994 |
| JP | 06 502684 | 3/1994 |
| JP | 06 145442 | 5/1994 |
| JP | 07 502068 | 3/1995 |
| JP | 08 012886 | 1/1996 |
| JP | 08 022945 | 1/1996 |
| JP | 09 111696 | 4/1997 |
| JP | 10 114854 | 5/1998 |
| JP | 10 298358 | 11/1998 |
| JP | 11 129379 | 5/1999 |
| JP | 11 129381 | 5/1999 |
| JP | 2000 265391 | 9/2000 |
| JP | 2000 303386 | 10/2000 |
| JP | 2000 345032 | 12/2000 |
| JP | 2001 020200 | 1/2001 |
| JP | 2001 098149 | 4/2001 |
| JP | 2002 363885 | 12/2002 |
| JP | 2003 192861 | 7/2003 |
| JP | 2003 292678 | 10/2003 |
| JP | 2004 003118 | 1/2004 |
| JP | 2004 034390 | 2/2004 |
| PT | 77224 | 8/1983 |
| WO | WO 80/01167 | 6/1980 |
| WO | WO 80/02430 | 11/1980 |
| WO | WO 88/05804 | 8/1988 |
| WO | WO 90/11605 | 10/1990 |
| WO | WO 93/04119 | 3/1993 |
| WO | WO 94/07956 | 4/1994 |
| WO | WO 96/15321 | 5/1996 |
| WO | WO 96/22329 | 7/1996 |
| WO | WO 97/00910 | 1/1997 |
| WO | WO 97/32934 | 9/1997 |
| WO | WO 97/34956 | 9/1997 |
| WO | WO 98/37152 | 8/1998 |
| WO | WO 98/54409 | 12/1998 |
| WO | WO 98/54410 | 12/1998 |
| WO | WO 98/56598 | 12/1998 |
| WO | WO 98/56860 | 12/1998 |
| WO | WO 98/56861 | 12/1998 |
| WO | WO 98/58613 | 12/1998 |
| WO | WO 99/01504 | 1/1999 |
| WO | WO 99/41309 | 8/1999 |
| WO | WO 99/43747 | 9/1999 |
| WO | WO 99/51815 | 10/1999 |
| WO | WO 99/58613 | 11/1999 |
| WO | WO 99/61703 | 12/1999 |
| WO | WO 00/05311 | 2/2000 |
| WO | WO 00/59840 | 10/2000 |
| WO | WO 00/59841 | 10/2000 |
| WO | WO 00/66657 | 11/2000 |
| WO | WO 00/76862 | 12/2000 |
| WO | WO 00/78540 | 12/2000 |
| WO | WO 01/12708 | 2/2001 |
| WO | WO 01/46307 | 6/2001 |
| WO | WO 01/53159 | 7/2001 |
| WO | WO 01/59215 | 8/2001 |
| WO | WO 01/66627 | 9/2001 |
| WO | WO 01/66635 | 9/2001 |
| WO | WO 01/66655 | 9/2001 |
| WO | WO 01/87580 | 11/2001 |
| WO | WO 01/87596 | 11/2001 |
| WO | WO 02/16509 | 2/2002 |
| WO | WO 03/039228 | 5/2003 |
| WO | WO 2004/046463 | 6/2004 |
| WO | WO 2004/074574 | 9/2004 |
| WO | WO 2005/013704 | 2/2005 |
| WO | WO 2005/014283 | 2/2005 |
| WO | WO 2005/044938 | 5/2005 |
| WO | WO 2005/047372 | 5/2005 |
| WO | WO 2005/061608 | 7/2005 |
| WO | WO 2005/108222 | 11/2005 |

OTHER PUBLICATIONS

Burgess Sr., Malcolm E. "Kaolin, A Glacier's Gift to Georgia," 1985.
Clay Minerals Society Homepage, http://cms/lanl.gov/instruct,html , "Instructions for Authors, Clays and Clays Minerals," *Instructions for Authors*, p. 4 of 5.
Jepson, W. P., "Kaolins, their properties and uses", Phil. Trans. R. Soc. Lond. A311, pp. 411-432, 1984.
Swan, A., "Realistic paper tests for various printing processes," Printing Technology, 13(1), 9-22, Apr. 1969.
Abstract, Japanese Patent No. 08012886A, publication date Jan. 1996.
Abstract, German Patent No. 3679147.
Abstract, German Patent No. 3689760.
Abstract, German Patent No. 3565272.
Abstract, German Patent No. 3466547.
English-language machine translation of FR 1 299 089, published Jul. 20, 1962, from AltaVista's Babelfish.
English language Derwent Abstract for FR 2 822 086, published Sep. 20, 2002.

English language Derwent Abstract for JP 4 270650, published Sep. 28, 1992.
English language Derwent Abstract for JP 55 129439, published Oct. 7, 1980.
English language Derwent Abstract for JP 07 251486, published Oct. 3, 1995.
English language Derwent Abstract for JP 09 111696, published Apr. 28, 1997.
English language Derwent Abstract for JP 10 298358, published Nov. 10, 1998.
English language Derwent Abstract for JP 11 129381, published May 18, 1999.
English language Derwent Abstract for JP 11 129379, published May 18, 1999.
English language Derwent Abstract for JP 2000 265391, published Sep. 26, 2000.
English language Derwent Abstract for JP 2000 303386, published Oct. 31, 2000.
English language Derwent Abstract for JP 2001 020200, published Jan. 23, 2001.
English language Derwent Abstract for JP 2002 363885, published Dec. 18, 2002.
English language Derwent Abstract for JP 2003 192861, published Jul. 9, 2003.
English language Derwent Abstract for JP 2003 292678, published Oct. 15, 2003.
English language Derwent Abstract for JP 2004 003118, published Jan. 8, 2004.
English language Derwent Abstract for JP 2004 034390, published Feb. 5, 2004.
English language Derwent Abstract for PT 77224, published Aug. 19, 1983.
U.S. Appl. No. 09/647,720, filed Oct. 4, 2000 Now U.S. Patent No. 6,616,749.
Co-Pending U.S. Appl. No. 09/930,994, filed Aug. 17, 2001 Now U.S. Patent No. 6,758,895.
Co-Pending U.S. Appl. No. 10/077,936, filed Jul. 18, 2002 Now abandoned.
Co-Pending U.S. Appl. No. 10/227,285, filed Aug. 26, 2002 Now U.S. Patent No. 6,610,137.
Co-Pending U.S. Appl. No. 10/233,599, filed Sep. 4, 2002 Now abandoned.
Co-Pending U.S. Appl. No. 10/324,019, filed Dec. 20, 2002 Now U.S. Patent No. 6,808,559.
Co-Pending U.S. Appl. No. 10/312,448, filed Aug. 17, 2001 Now U.S. Patent No. 7,413,601.
International Search Report issued Dec. 28, 2001, in PCT International Application No. PCT/GB01/03717, filed Aug. 17, 2001.
International Preliminary Examination Report issued Aug. 20, 2002, in PCT International Application No. PCT/GB01/03717, filed Aug. 17, 2001.

KAOLIN PRODUCTS AND THEIR PRODUCTION

This application is a divisional of U.S. application Ser. No. 10/344,676, filed Nov. 7, 2003 now U.S. Pat. No. 7,442,281, which claims the benefit of the priority of the filing date of PCT International Application No. PCT/GB01/03717, filed Aug. 17, 2001, and United Kingdom Application No. 0020180.6, filed Aug. 17, 2000. The entire contents of those three applications are incorporated herein by reference.

The present invention relates to kaolin products and their production. In particular, it relates to kaolin fillers for use in making super-calendered (SC) papers and their production.

Mineral fillers are used in the production of most papers for printing or writing applications. The incorporation of such fillers together with cellulose fibres in a paper making composition reduces the overall cost of the raw materials and can improve optical and printing properties of the paper. However, adding fillers causes reduction in the strength of the paper, so there is a practical limit to the amount of fillers normally used in the paper making composition.

Highly filled uncoated papers can compete with some coated paper grades. Suitable smoothness, gloss, density per unit area and printing ink porosity can be achieved by multiple calendering of the filled paper sheets. The well known process of calendering involves compressing the sheets between rollers in one or more passes (each pass being known in the art as a 'nip').

Highly filled uncoated, calendered papers having properties approaching those of coated papers are generally known as super-calendered (SC) papers. Such papers can be used for various applications, particularly involving printing upon the paper by rotogravure or offset processes.

Kaolin materials have been widely used in the prior art as fillers for making SC papers. One purpose of the present invention is to provide hydrous kaolin materials suitable for use as improved fillers in the production of SC papers. Another purpose is to provide an improved method of making such materials.

According to the present invention in a first aspect there is provided a method of producing a kaolin particulate material suitable for use as improved SC filler includes the steps of:
(a) preparing an aqueous feed suspension of kaolin;
(b) treating the kaolin of the feed suspension by attrition grinding in a grinding vessel using grinding media granules;
(c) delivering an aqueous suspension of the kaolin ground in step (b) to a particle size classifier and separating the kaolin of the suspension into a coarse fraction and a fine fraction;
(d) returning an aqueous suspension of the coarse fraction produced in step (c) to the grinding vessel to be further attrition ground; and
(e) extracting an aqueous suspension of the fine fraction produced in step (c) as a product suspension;

wherein the kaolin of the feed suspension in step (a) is such that not more than 30% by weight has a particle size less than 2 µm and not more than 30% by weight has a particle size greater than 10 µm and wherein the kaolin of the product suspension produced in step (e) is such that not more than 10% by weight has a particle size greater than 10 µm and not more than 10% by weight has a particle size less than 0.25 µm.

The required particle size distribution of the kaolin feed suspension may be obtained by treating a pre-feed aqueous suspension of kaolin by classification using a suitable particle size classifier and selecting the coarse fraction produced by the classifier as the feed suspension in step (a). The classifier may comprise a centrifuge, e.g. a decanter centrifuge.

Preferably, in step (a) not more than 20% by weight of the particles have a particular size of less than 2 µm. Preferably, in step (a) not more than 25%, desirably less than 20%, by weight of the particles have a size greater than 10 µm.

In the grinding step (b) in the method according to the first aspect of the invention, the grinding may be carried out in a vertical stirred grinding vessel of the kind described in GB1469028. The work input applied in the grinding vessel in step (b) may for example be in the range of from 10 kw·h·t$^{-1}$ to 300 kw·h·t$^{-1}$ particularly from 25 kw·h·t$^{-1}$ to 100 kw·h·t$^{-1}$ based on the dry weight of kaolin processed.

The solids content of the suspension of kaolin during grinding may be selected from a wide range of solids contents to give dilute, medium solids or concentrated suspensions. We prefer to use a solids content of from 15% to 35% by weight during grinding. A dispersant, e.g. one of the kaolin dispersants well known in the art, such as an organic agent, e.g. sodium polyacrylate, or an inorganic agent, e.g. sodium hexametaphosphate, may be present during grinding.

Preferably, during grinding, the pH of the suspension is in the range 4 to 7, especially from 5 to 7.

Preferably, the granules of the grinding media are such that at least 90% by weight of the granules have sizes in the range 1 mm to 2 mm.

The particle size classifier used in step (c) may comprise one or more hydrocylones or one or more decanter centrifuges or a combination of one or more hydrocyclones and/or more decanter centrifuges. For example, where multiple devices are used, these may be arranged in parallel, a portion of the suspension to be treated being fed through each device.

The solids content of the suspension delivered to the particle size classifier in step (c) may be reduced after the suspension leaves the grinding vessel in which the suspension is ground prior to delivery to the particle size classifier. Water may be added to the suspension which leaves the grinding vessel to dilute the suspension delivered to the particle size classifier. For example, the solids content may be reduced by a differential percentage by weight of between 5% and 20% by weight, e.g. by between 5% and 10% by weight. The solids content of the coarse fraction returned to the grinding vessel in step (d) may be greater than that of the suspension in the grinding vessel in step (b). For example, the solids content of the returned coarse fraction may be in the range 25% to 40% by weight. The solids content of the returned coarse fraction may be increased by a differential percentage by weight of at least 2%, e.g. by between 5% and 20% by weight compared with that in the grinding vessel in step (b).

We have found that the method according to the first aspect of the invention unexpectedly and beneficially allows kaolin particulate materials to be made which show improved properties when used as sc fillers to be produced in an economical manner. Preferably, the method according to the first aspect of the invention includes no stages involving separation of impurities by chemical treatment, e.g. froth flotation. Avoiding such stages enables an economic production process to be achieved.

Kaolin of the product suspension extracted in the step (e) may be subjected to one or more further known treatment steps, e.g. screening, pH adjustment, ageing to thicken and/or condition and bleaching. The suspension is desirably dewatered, e.g. by one or more techniques such as filtering or pressing and/or thermally dried to a powder.

The kaolin of the product suspension extracted in step (e), herein the 'product kaolin', may have the following properties. The cumulative percentages P by weight of particles of the product kaolin having a size greater or less than X for different values of X are preferably as follows.

| X (μm) | P (%) |
|---|---|
| >10 | Not more than 10 |
| <2 | Not less than 30 |
| <1 | Not less than 15 |
| <0.25 | Not more than 10 |

Preferably, the cumulative percentages P of particles of the product kaolin having a size greater or less than X for different values of X are as follows:

| X (μm) | P (%) |
|---|---|
| >10 | Not more than 7 |
| <2 | Not less than 33 |
| <1 | Not less than 20 |
| <0.25 | Less than 10 |

In some cases, the cumulative percentages P of particles of the product kaolin having a size greater or less than X for different values of X are as follows:

| X (μm) | P (%) |
|---|---|
| >10 | Not more than 7 |
| <2 | At least 60 |
| <1 | At least 40 |
| <0.5 | At least 15 |
| <0.25 | Less than 10 |

In this specification, all particle size properties including particle size distributions or plots of P versus X as described above and also mean particle size are as determined for a fully dispersed dilute aqueous suspension of the particulate material in question by sedimentation using a SEDIGRAPH™ 5100 machine, (supplied by the Micromeritics Corporation) in a well-known manner.

The mean particle size of the kaolin product (value of X defined above when P is 50%) may be from 0.5 μm to 2.0 μm, e.g. from 0.9 μm to 1.6 μm.

The Einlehener abrasion of the kaolin product may be less than 90 g·m$^{-2}$, preferably not greater than than 80 g·m$^{-2}$ The steepness factor of the kaolin product may be at least 32, in some cases at least 35 or preferably 40 or higher. The 'steepness factor', (sometimes referred to as 'narrowness') refers to the steepness of the particle size distribution curve as measured by the SEDIGRAPH 5100 machine in the manner described earlier and is given by the expression 100× $(d_{30} \div d_{70})$, where $d_{30}$ is the value of the particle size less than which there are 30% by weight of the particles and $d_{70}$ is the value of the particle size less than which there are 70% by weight of the particles.

The brightness of the kaolin product may be at least 80 ISO units, preferably at least 82 ISO units measured in a well-known manner according industry (TAPPI) standard procedures.

The shape factor of the particles of the kaolin product may be at least 30, preferably at least 40, in some cases at least 50. The expression 'shape factor' as used herein means the average value (on a weight average basis) of the ratio of mean particle diameter to particle thickness for a population of particles ie the kaolin product of varying size and shape as measured using the electrical conductivity method and apparatus described in GB-A-2240398, U.S. Pat. No. 5,128,606 and EP-A-528078 and using the equations derived in these patent specifications. 'Mean particle diameter' is here defined as the diameter of a circle, which has the same area as the largest face of the particle. In the electrical conductivity measurement method described in the said specifications, the electrical conductivity of a fully dispersed aqueous suspension of the particles under test is caused to flow through an elongated tube. Measurements of the electrical conductivity are taken between (a) a pair of electrodes separated longitudinally along the axis of the tube and (b) a pair of electrodes separated transversely across the tube. The shape factor of the particles under test calculated from the two conductivity measurements.

Kaolin products having the properties described earlier, obtained by use of the method according to the first aspect of the invention in their production, show improved performance as SC fillers. In particular, the combination of the defined values of steepness factor and shape factor give, in an SC paper made from the kaolin product, a beneficially enhanced combination of high brightness and high porosity and thereby enhanced printability, especially for printing by the rotogravure or offset process.

According to the present invention in a second aspect there is provided a composition for use in making paper to be treated by a super-calendering process includes an aqueous suspension of cellulose fibres and filler particles, wherein the filler particles comprise the kaolin product defined earlier.

The filler particles may constitute at least 10%, preferably up to 40%, of the solids content of the composition according to the second aspect.

The kaolin product may form substantially all of the said filler particles or may be blended in a known manner with other filler particles in the said composition. For example, calcium carbonate, which may be particulate material either obtained from natural sources and processed for example by grinding or which has been chemically synthesised (precipitated) may be included in such a blend on account of their brightness contribution. For example, the filler particles may comprise from 60% to 100% by weight of the kaolin product and from 0% to 40% by weight calcium carbonate. Other filler materials, which may optionally be included in a blend of materials together with the product kaolin include other hydrous kaolin, calcined kaolin, $TiO_2$, calcium sulphate or other fillers well known in the paper making art.

Embodiments of the present invention will now be described by way of example with reference to the accompanying drawing, in which:

FIG. 1 is a diagram in schematic flowsheet form of an arrangement of apparatus for treating kaolin in accordance with a method embodying the invention.

As shown in FIG. 1, a pre-feed dispersed kaolin suspension 1 is fed to a decanter centrifuge 3 in which it is separated into a fine fraction 5 and a coarse fraction 7. The fine fraction 5 may be further processed and used as a product in a known manner. The pH of the coarse fraction is adjusted to about pH5 in a vessel 9 by addition of alkali 11 from a source 13. The kaolin of the resulting suspension has a particle size distribution such that not greater than 20% by weight of the kaolin particles have a particle size of greater than 10 μm, not greater than 20% by weight have a particle size of less than 2 μm and less than 5% by weight have a particle size of less than 0.25 μm. This kaolin is delivered as a feed suspension to a media attrition grinder 15 of the kind described earlier. The suspension is ground in the grinder 15.

A suspension 17 of ground kaolin from the grinder 15 is fed to a mixing vessel 19 where it is diluted by addition of water from a source 21. The diluted suspension is pumped by a pump 23 to a bank 25 of hydrocyclones through which portions of the 30 suspension are fed and treated. The hydrocyclones separate the kaolin into a coarse fraction 27 and a fine fraction 29. The course fraction 27, which has a solids content greater than 30%, is returned to the grinder 15. The fine fraction 29 is further treated in a known manner by processing 31, e.g. screening to remove large particles, pH adjustment to pH 4, and bleaching using a dithionite reductive bleaching agent. Finally, the fine fraction 29 is dewatered by a tube press filter 33 to a moisture content of about 18% by weight and, if desired in dry form, thermally dried in a drier 35 to produce a final kaolin product 37.

Examples of kaolin products produced in the manner described above with reference to FIG. 1 are as follows.

EXAMPLE 1

A first example of a kaolin product embodying the invention showed the following properties (where X and P are as defined earlier):

| X (µm) | P (%) |
|---|---|
| >10 | Not more than 6 |
| <2 | 38 |
| <1 | 24 |
| <0.5 | 13 |
| <0.25 | Not more than 7 |

The kaolin product also had the following properties:
Powder Brightness (ISO units): 80
Yellowness (ISO units): 4.0
Abrasion: 85 mg·m$^{-2}$
Shape Factor: 30

EXAMPLE 2

A second example of a kaolin product embodying the invention showed the following properties (where X and P are as defined earlier):

| X (µm) | P (%) |
|---|---|
| >5 | 15 |
| <2 | 50 |
| <1 | 30 |
| <0.25 | Not more than 8 |

The kaolin product also had the following properties:
Powder Brightness (ISO units): 82.5
Yellowness (ISO units): 5.0
Abrasion 75 g·m$^{-2}$
Shape Factor: 45

The invention claimed is:

1. A particulate product comprising kaolin having a brightness of at least 80 and a shape factor of at least 30, and the kaolin is such that not more than 10% by weight has a particle size greater than 10 µm and not more than 10% by weight has a particle size less than 0.25 µm.

2. A particulate product according to claim 1, wherein the particulate product is a filler.

3. A paper making composition comprising, in an aqueous suspension, cellulose fibers and filler particles, wherein the filler particles comprise the particulate product according to claim 2.

4. A paper making composition according to claim 3, wherein the filler particles comprise at least 10% of the solids content of the composition.

5. A paper making composition according to claim 4, wherein the filler particles comprise at least 15% of the solids content of the composition.

6. A particulate product according to claim 2, further comprising additional filler particles.

7. A particulate product according to claim 6, wherein the additional filler particles comprise calcium carbonate, hydrous kaolin, calcined kaolin, titanium dioxide, calcium sulfate, and mixtures thereof.

8. A particulate product according to claim 2, wherein the particulate product is a filler for super-calendered paper.

9. A particulate product according to claim 8, wherein the particulate product has the following particle size distribution:
not less than 30% of the cumulative percentage of particles have a size less than 2 µm; and
not less than 15% of the cumulative percentage of particles have a size less than 1 µm.

10. A particulate product according to claim 8, wherein the particulate product has the following particle size distribution:
not more than 7% of the cumulative percentage of particles have a size greater than 10 µm;
not less than 33% of the cumulative percentage of particles have a size less than 2 µm; and
not less than 20% of the cumulative percentage of particles have a size less than 1 µm.

11. A particulate product according to claim 8, wherein the particulate product has the following particle size distribution:
not more than 7% of the cumulative percentage of particles have a size greater than 10 µm;
at least 60% of the cumulative percentage of particles have a size less than 2 µm;
at least 40% of the cumulative percentage of particles have a size less than 1 µm; and
at least 15% of the cumulative percentage of particles have a size less than 0.5 µm.

12. A particulate product according to claim 1, wherein the particulate product comprises particles, wherein not less than 30% by weight of said particles have a particle size less than 2 µm.

13. A particulate product according to claim 1, wherein the particulate product comprises particles, wherein not less than 15% by weight of said particles have a particle size less than 1 µm.

14. A particulate product according to claim 1, wherein the particulate product comprises particles, wherein not less than 33% by weight of said particles have a particle size less than 2 µm.

15. A particulate product according to claim 1, wherein the particulate product comprises particles, wherein not less than 20% by weight of said particles have a particle size less than 1 µm.

16. A particulate product according to claim 1, wherein the particulate product comprises particles, wherein not more than 7% by weight of said particles have a particle size greater than 10 µm.

17. A particulate product according to claim 1, wherein the particulate product comprises particles, wherein at least 60% by weight of said particles have a particle size less than 2 μm.

18. A particulate product according to claim 1, wherein the particulate product comprises particles, wherein at least 40% by weight of said particles have a particle size less than 1 μm.

19. A particulate product according to claim 1, wherein the particulate product comprises particles, wherein at least 15% by weight of said particles have a particle size less than 0.5 μm.

20. A particulate product according to claim 1, wherein the kaolin of the particulate product has a steepness factor of at least about 35.

21. A particulate product according to claim 1, wherein the kaolin of the particulate product has a steepness factor of at least about 40.

22. The particulate product according to claim 1, wherein the kaolin has a steepness factor of at least about 32.

23. The particulate product according to claim 1, wherein the kaolin has a mean particle size ranging from 0.5 μm to 2.0 μm.

24. The particulate product according to claim 1, wherein the kaolin has an Einlehner abrasion less than 90 $g/m^2$.

25. A composition comprising a kaolin having an Einlehner abrasion less than 90 $g/m^2$, wherein not more than 10% by weight of the kaolin has a particle size greater than 10 μm and not less than 15% of the kaolin has a particle size greater than 1 μm.

26. The composition of claim 25, wherein not less than 30% by weight of the kaolin has a particle size greater than 2 μm.

27. The composition of claim 25, wherein the kaolin has a brightness greater than 80.

* * * * *